United States Patent
Xiao et al.

(10) Patent No.: US 12,480,078 B2
(45) Date of Patent: Nov. 25, 2025

(54) 3D MULTI-ORGAN CO-CULTURE CHIP

(71) Applicant: BEIJING DAXIANG BIOTECH CO., LTD, Beijing (CN)

(72) Inventors: Rongrong Xiao, Beijing (CN); Yu Zhou, Beijing (CN)

(73) Assignee: BEIJING DAXIANG BIOTECH CO., LTD, Beijing (CN)

(*) Notice: Subject to any disclaimer, the term of this patent is extended or adjusted under 35 U.S.C. 154(b) by 759 days.

(21) Appl. No.: 17/537,525

(22) Filed: Nov. 30, 2021

(65) Prior Publication Data
US 2022/0098534 A1 Mar. 31, 2022

Related U.S. Application Data

(63) Continuation of application No. PCT/CN2020/126309, filed on Nov. 4, 2020.

(30) Foreign Application Priority Data

Sep. 30, 2020 (CN) .......................... 202011064607.8

(51) Int. Cl.
 *C12M 3/00* (2006.01)
 *C12M 1/00* (2006.01)
 (Continued)

(52) U.S. Cl.
 CPC ............ *C12M 21/08* (2013.01); *C12M 23/12* (2013.01); *C12M 23/16* (2013.01); *C12M 23/20* (2013.01); *C12M 33/22* (2013.01)

(58) Field of Classification Search
 CPC ...... C12M 21/08; C12M 23/12; C12M 23/16; C12M 23/20; C12M 33/22
 See application file for complete search history.

(56) References Cited

U.S. PATENT DOCUMENTS

2008/0044894 A1* 2/2008 Lee .................. C12M 23/16
                                                    435/307.1
2016/0325278 A1* 11/2016 Takagi ............. B01L 3/502707
(Continued)

FOREIGN PATENT DOCUMENTS

CN    103667054 A    3/2014
CN    107475115 A    12/2017
(Continued)

OTHER PUBLICATIONS

Document entitled CN110106081A Microfluidic Chip for Constructing Brain Functional Unit Model and Construction Method, machine translation of CN 110106081 A provided by Espacenet, original document published 2019. (Year: 2019).*
(Continued)

*Primary Examiner* — Michael A Marcheschi
*Assistant Examiner* — Ashley Lopezlira
(74) *Attorney, Agent, or Firm* — Westbridge IP LLC

(57) ABSTRACT

A 3D multi-organ co-culture chip is provided by present disclosure and comprises a chip body, wherein one or more groups of culture modules are arranged on the chip body; an each group of the culture modules comprises a fluid storage hole of which an end is open and is positioned at an upper surface of the chip body; a first culture micropore which is positioned below a corresponding fluid storage hole and communicates with the corresponding fluid storage hole; a second culture micropore which is positioned below a corresponding first culture micropore and communicates with the corresponding first culture micropore; and a plurality of second fluid operation holes, wherein an end of an second fluid operation hole is open and is positioned on the upper surface of the chip body and an other end of the second fluid operation hole communicates with a corresponding second culture micropore through a channel.

11 Claims, 13 Drawing Sheets

(51) Int. Cl.
*C12M 1/26* (2006.01)
*C12M 1/32* (2006.01)
*C12M 3/06* (2006.01)

(56) References Cited

U.S. PATENT DOCUMENTS

| | | |
|---|---|---|
| 2019/0017999 A1* | 1/2019 | Jeon ................ C12N 5/0629 |
| 2020/0123484 A1* | 4/2020 | Tseng ................ C12M 23/16 |
| 2020/0238277 A1* | 7/2020 | Ohkura ............ B01L 3/502761 |
| 2020/0239821 A1* | 7/2020 | Go .................... C12M 27/00 |
| 2020/0269234 A1* | 8/2020 | Kujala ............... C12M 23/16 |
| 2020/0270582 A1* | 8/2020 | Jang ................. G01N 33/5064 |
| 2021/0062129 A1* | 3/2021 | Nawroth ........... G01N 33/5044 |

FOREIGN PATENT DOCUMENTS

| | | |
|---|---|---|
| CN | 110106081 A | 8/2019 |
| CN | 210103904 U | 2/2020 |
| CN | 110923138 A | 3/2020 |
| CN | 111269830 A | 6/2020 |
| CN | 111607516 A | 9/2020 |
| CN | 112390879 A | 2/2021 |
| CN | 112898421 A | 6/2021 |

OTHER PUBLICATIONS

Document entitled CN111269830A a Multi-Organ Chip Based On Microfluidics Technology and Its Application, machine translation of CN 111269830 A provided by Espacenet, original document published 2020. (Year: 2020).*

* cited by examiner

3D MULTI-ORGAN CO-CULTURE CHIP

CROSS-REFERENCE TO RELATED APPLICATIONS

This application is a continuation of PCT application PCT/CN2020/126309, filed Nov. 4, 2020; which is filed based on Chinese patent application with an application number of 202011064607.8 and an application date of Sep. 30, 2020, and claims the priority of the Chinese patent application. The entire contents of these applications are hereby incorporated into this application by reference.

TECHNICAL FIELD

The application relates to the technical field of biological tissue engineering, and for example, relates to a 3D multi-organ co-culture chip.

BACKGROUND

Conventional 2D cell culture has been developed for nearly a century and has contributed great value in the field of biological medicine, but the 2D culture mode cannot realize tissue specificity and differentiation function of various cell types or accurately predict in-vivo tissue function and pharmaceutical activity. The in-vitro constructed 3D cell model can better represent a spatial and chemical complexity model of living tissue. Compared with a conventional 2D model, the 3D cell model has great advantages in research of molecular mechanism of tissue function, collection of signal channels and drug response of certain diseases. However, the conventional 3D model also has some limitations, for example, organoids are variable in size and shape, and it is difficult to fix cells at consistent positions for next-step analysis. Besides, many 3D model systems lack micro-scale structures and multi-organ co-cultured tissue-tissue interfaces. For example, vascular endothelial cell layers and surrounding connective tissue and parenchyma cells are important to all organs. Moreover, cells cannot be exposed in normal mechanical signals such as fluid shear force, tension and compression force, which can affect development and function of the organs. Fluid flowing is lacked, and interaction among cultured tissue cells, circulating blood cells and immune cells can be affected.

The microfluidic organ chip technology is an emerging technology that can overcome these limitations. The organ chip comprises a continuous perfusion cell culture channel that simulates the physiological structure of the tissue and organ level, which can reproduce the multi-cell structure, the tissue-tissue interface, the physical and chemical microenvironment and the body blood vessel perfusion, and these devices can reproduce functional levels of tissue and organs. Moreover, high-resolution and real-time imaging of living cells can be realized, and biochemical, gene and metabolic activity can be monitored. The technology has great potential, and promotes research of tissue development, physiological and pathological organs. In the drug discovering and development process, the organ chip technology has important effects in research of lead compounds, drug toxicity testing and biomarker identification. The organ chip technology can construct a low-cost in-vitro model to reproduce functions of tissue and organ levels.

In the process of realizing the embodiment of the present disclosure, at least the following problems exist in related technologies: the existing co-culture microfluidic organ chip is narrow in application range, poor in universality, complex in model construction operation and complex in fluid control mode.

SUMMARY

In order to have a basic understanding of some aspects of the disclosed embodiments, a brief summary is given below. The summary is not a general comment, nor is it intended to determine the key/important component elements or describe the protection scope of these embodiments, but serves as a prelude to the detailed description that follows.

The embodiment of the present disclosure provides a 3D multi-organ co-culture chip, and aims to solve the problems that an existing co-culture microfluidic organ chip is narrow in application range, poor in universality, complex in model construction operation and complex in fluid control mode.

In some embodiments, the 3D multi-organ co-culture chip comprises a chip body, wherein one or more groups of culture modules are arranged on the chip body; an each group of the culture modules comprises:
a fluid storage hole of which an end is open and is positioned at an upper surface of the chip body;
a first culture micropore which is positioned below a corresponding fluid storage hole and communicates with the corresponding fluid storage hole;
a second culture micropore which is positioned below a corresponding first culture micropore and communicates with the corresponding first culture micropore; and
a plurality of second fluid operation holes, wherein an end of an second fluid operation hole is open and is positioned on the upper surface of the chip body, and an other end of the second fluid operation hole communicates with a corresponding second culture micropore through a channel.

The 3D multi-organ co-culture chip provided by the embodiment of the present disclosure has the following technical effects:

the 3D multi-organ co-culture chip provided by the embodiment of the present disclosure is simple in structure, second fluid operation holes communicate with the second culture micropores through the channels (such as through channels), simple operation is carried out through the fluid storage holes and the fluid operation holes, cell inoculation, liquid change, sampling and other operations are facilitated, the operation is simple, professional technicians are not needed, the application range of the culture chip is expanded, and the universality is improved. The first culture micropores and the second culture micropores can flexibly realize independent or co-culture of 2D and 3D organs. Fluid driving based on gravity is a simple and accurate fluid control mode, real-time dynamic updating of the culture environment in the second culture micropores can be realized, and long-time in-vitro dynamic co-culture of multiple organs can be realized. The plurality of culture modules are arranged according to the spacing and high flux of porous plates and are compatible with high-flux and automatic equipment. Organ specific responses such as aggregation circulating immune cells, response medicines, toxins and other environmental interferences can be realized by combining physical acting forces including physiological level related fluid shear force, circulating pressure and mechanical compression force. Moreover, long-time in-vitro dynamic co-culture of multiple organs can be realized.

The above general description and the following description are only exemplary and explanatory, and are not used to limit the application.

BRIEF DESCRIPTION OF DRAWINGS

One or more embodiments are exemplified by the accompanying drawings, these exemplified descriptions and drawings do not constitute a limitation on the embodiments, elements with the same reference numerals in the drawings are shown as similar elements, and the drawings do not constitute a limitation of proportions, wherein.

DETAILED DESCRIPTION OF THE EMBODIMENTS

Figure 1:
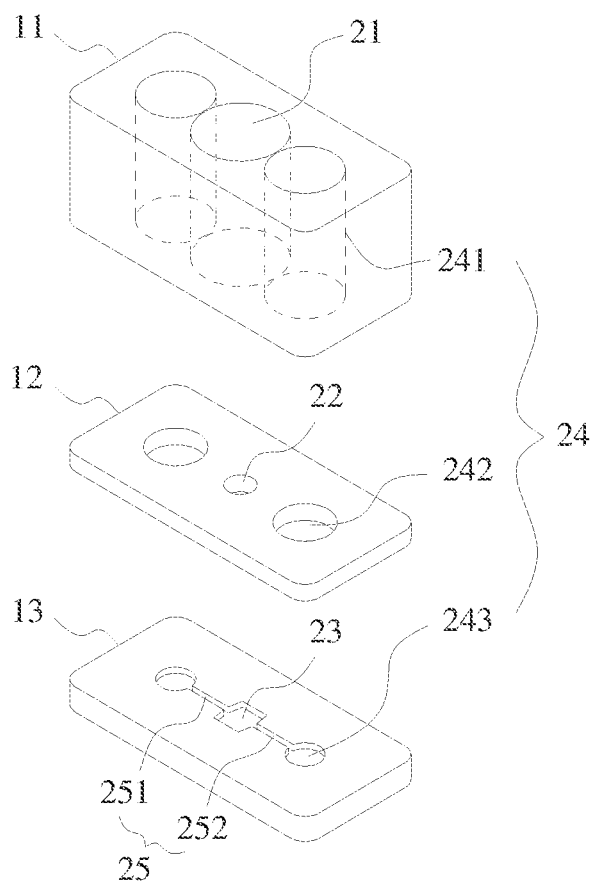
FIG. 1 is a structure exploded schematic diagram of culture modules of a 3D multi-organ co-culture chip provided by the embodiment of the present disclosure.

In order to know more about the features and technical content of the embodiments of the present disclosure, the implementation of the embodiments of the present disclosure will be described in detail below with reference to the attached drawings, and the attached drawings are for reference only and are not used to limit the embodiments of the present disclosure. In the following technical description, for the convenience of explanation, multiple details are used to provide a sufficient understanding of the disclosed embodiments. However, one or more embodiments can still be implemented without these details. In other cases, in order to simplify the drawings, well-known structures and devices may be simplified for display.

The terms "first" and "second" in the description and claims of the embodiments of the present disclosure and the above-mentioned attached drawings are used to distinguish similar objects, and are not necessarily used to describe a specific sequence or precedence order. It should be understood that the data used in this way can be interchanged under appropriate circumstances for facilitating the embodiments of the present disclosure described herein. In addition, the terms "including" and "having" and any variations of them are intended to cover non-exclusive inclusions.

In the embodiments of the present disclosure, the orientation or position relationship indicated by the terms "upper", "lower", "inner", "middle", "outer", "front", "rear", etc. is the orientation or position relationship based on the attached drawings. These terms are mainly used to better describe the embodiments of the present disclosure and the embodiments thereof, and are not used to limit that the indicated device, element, or component must have a specific orientation, or be constructed and operated in a specific orientation. In addition, some of the above terms may be used to indicate other meanings in addition to the orientation or position relationship, for example, the term "upper" may also be used to indicate a certain dependency relationship or connection relationship in some cases. For those of ordinary skill in the art, the specific meanings of these terms in the embodiments of the present disclosure can be understood according to specific situations.

In addition, the terms "mounting", "connection", and "fixation" should be interpreted broadly. For example, "connection" can be a fixed connection, a detachable connection, or an integral structure; it can be a mechanical connection or an electrical connection; it can be a direct connection, or an indirect connection through an intermediary, or inner communication of two devices, elements or components. For those of ordinary skill in the art, the specific meanings of the above-mentioned terms in the embodiments of the present disclosure can be understood according to specific situations.

Unless otherwise stated, the term "plurality" means two or more.

It should be noted that, in the case of no conflict, the embodiments in the embodiments of the present disclosure and the features in the embodiments can be combined with each other.

As shown in FIG. 1-FIG. 11, the embodiment of the present disclosure provides a 3D multi-organ co-culture chip shown, and the 3D multi-organ co-culture chip comprises a chip body, wherein one or more culture modules are arranged on the chip body. Each culture module comprises a fluid storage hole 21, a first culture micropore 22, a second culture micropore 23 and a plurality of second fluid operation holes 24. One end of each fluid storage hole 21 is open and is positioned on the upper surface of the chip body. Each first culture micropore 22 is used for culturing a first organ cell; each first culture micropore is positioned below the corresponding fluid storage hole 21 and communicates with the corresponding fluid storage hole 21. Each second culture micropore 23 is used for culturing a second organ cell; each second culture micropore 23 is positioned below the corresponding first culture micropore 22 and communicates with the corresponding first culture micropore 22. One end of each of the plurality of second fluid operation holes 24 is open and is positioned on the upper surface of the chip body, and the other end of each of the plurality of second fluid operation holes 24 communicates with the second culture micropore 23 through a channel.

The 3D multi-organ co-culture chip provided by the embodiment of the present disclosure is simple in structure, the second fluid operation holes communicate with the second culture micropores through the channels (such as through channels), simple operation is performed through the fluid storage holes and the fluid operation holes, so that cell inoculation, liquid change, sampling and other operations are facilitated, the operation is simple, professional technicians are not needed, the application range of the culture chip is expanded, and the universality is improved. The first and second culture micropores can flexibly realize separate or co-culture of 2D and 3D organs. Gravity-based fluid driving is a simple and accurate fluid control mode, so that real-time dynamic update of a culture environment in the second culture micropores can be realized, and long-time in-vitro dynamic co-culture of multiple organs can be realized. The plurality of culture modules are arranged according to the spacing high flux of porous plates, and are compatible with high-flux and automatic equipment. Physical acting forces including fluid shear force, circulating pressure and mechanical compression force related to physiological level can be combined, so that organ-specific aggregation response such as circulating immune cells, response drugs, toxins and other environmental interferences can be realized. Moreover, long-time in-vitro dynamic co-culture of multiple organs can be realized.

The 3D multi-organ co-culture chip disclosed by the embodiment of the present disclosure can be used for in-vitro constructing a multi-organ model. Second organ cells cultured in the second culture micropores 23 can be one kind of or more kinds of cells related to the same organ, such as two, three or more kinds of cells. The co-culture chip can realize in-situ 2D or 3D co-culture of multiple types of organs. The co-culture chip can be used for constructing models for researching interaction of multiple organs, such as a blood vessel-tumor model, a blood brain barrier-tumor model and the like, and is used for researching angiogenesis, drug penetration, cell polarization, cell migration, drug activity evaluation and the like.

In the embodiment of the present disclosure, in the culture modules, a culture medium or drug diluent and the like, which providing a required culture fluid or a drug needing to be tested and the like for first organ cells, are contained in each fluid storage hole 21. The first organ cells can be subjected to 3D culture in the first culture micropores 22. The second organ cells are cultured in the second culture micropores 23, namely the fluid storage holes 21, the first culture micropores 22 and the second culture micropores 23 are coaxially communicated. Micro-flow control of the culture fluid in the second culture micropores 23 is realized through the second fluid operation holes 24 and the channels, fluid operation is performed through the fluid storage holes 21 and the second fluid operation holes 24, and the method is a simple and accurate fluid control mode.

In the embodiment of the present disclosure, the fluid storage holes 21, the first culture micropores 22, the second culture micropores 23 and the second fluid operation holes 24 are not limited in shapes, and can be circular holes, ellipses, squares, rectangles, sectors or polygons (such as hexagons and octagons); under the condition of meeting design requirements, the shapes of the fluid storage holes 21 and the second fluid operation holes 24 are designed on the basis of containing more culture media or drug diluents as much as possible, and the shapes of the first culture micropores 22 and the second culture micropores 23 are designed on the basis of facilitating growth.

Optionally, the shapes of the fluid storage holes 21 and the second fluid operation holes 24 include circles or ellipses.

Optionally, the shapes of the first culture micropores 22 are circles.

Optionally, the shapes of the second culture micropores 23 are squares, rectangles or hexagons.

In addition, planting and culture of first organ cells in the first culture micropores 22 adopt an open through hole mode, so that subsequent computer detection and cell recovery are facilitated for analysis such as RNA and protein extraction. The number and arrangement form of culture modules arranged on the chip body are not limited, and can be determined as required.

In the embodiment of the present disclosure, the second culture micropores 23 can be through pores or grooves.

Optionally, the second culture micropores 23 are through pores. The fluid storage holes 21, the first culture micropores 22 and the second culture micropores 23 form through holes, and the chip body can be matched with a bottom plate for use when in use.

Optionally, the second culture micropores 23 are grooves. The fluid storage holes 21, the first culture micropores 22 and the second culture micropores 23 form non-through holes, and the bottom plate is not needed.

Optionally, the number of the plurality of culture modules arranged on the chip body is 12, 24, 36 or 96, and the like, and the arrangement mode in the plurality of culture modules is compatible and matched with the existing commercial sample adding equipment and detectors (such as microplate readers and high-content imaging systems). High-throughput organ culture and detection are realized.

In some embodiments, cross sections of the fluid storage holes 21 are larger than cross sections of the first culture micropores 22; the cross sections of the second culture micropores 23 are larger than or equal to those of the first culture micropores 22. In the embodiments, the cross sections of the fluid storage holes 21 are larger than those of the first culture micropores 22, so that cells in the first culture micropores 22 are not influenced in the liquid changing process. The cross sections of the second culture micropores 23 are larger than those of the first culture micropores 22, so that cells growing on the edges of the second culture micropores 23 are not in contact with or less in contact with cells in the first culture micropores 22.

In the embodiment of the present disclosure, the relative size of the cross sections of the fluid storage holes 21 and the cross sections of the second culture micropores 23 are not limited and can be set according to actual needs.

Optionally, when the cross sections of the fluid storage holes 21 are larger than those of the first culture micropores 22, the cross sections of the fluid storage holes 21 are larger than those of the second culture micropores 23. Culture operation and observation are facilitated.

In the embodiment of the present disclosure, the specific sizes of the fluid storage holes 21, the first culture micropores 22 and the second culture micropores 23 in the culture modules can be determined according to actual needs and are not limited here.

In the embodiment of the present disclosure, the fluid storage holes 21 are columnar holes, and reduce the risk of cross-contamination between the holes and reduce the edge effect caused by evaporation.

Figure 2:
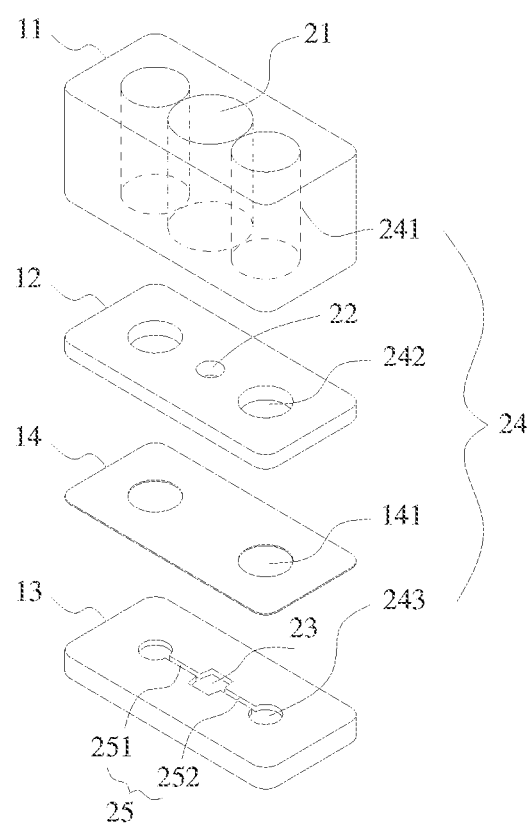
FIG. 2 is a structure exploded schematic diagram of culture modules of another 3D multi-organ co-culture chip provided by the embodiment of the present disclosure.

In the embodiment of the present disclosure, the first culture micropores 22 communicate with the second culture micropores 23, the communication between the first culture micropores 22 and the second culture micropores 23 is generalized understanding, including direct communication (as shown in FIG. 1) between the first culture micropores 22 and the second culture micropores 23, and also including diaphragm-based communication between the first culture micropores 22 and the second culture micropores 23, for example, as shown in FIG. 2, film layers 14 are arranged between the first culture micropores 22 and the second culture micropores 23, but micro-nano-sized pores are distributed in the film layers 14, and through the micro-nano-sized pores, culture fluid in the first culture micropores 22 and the second culture micropores 23 can be subjected to substance exchange, and the first culture micropores 22 and the second culture micropores 23 can be considered as being communicated. According to that the first culture micropores 22 and the second culture micropores 23 are subjected to direct communication or diaphragm-based communication, different organ models can be constructed for related research.

Optionally, the communication mode between the first culture micropores 22 and the second culture micropores 23 is direct connection, that is, no diaphragm is arranged. The 3D multi-organ co-culture chip composed of the culture modules is defined as a diaphragm-free chip. For the diaphragm-free chip, when organ cell implantation is carried out, two organs are physically isolated through a 3D matrix, and the first organ and the second organ cells cultured in a 3D manner and secretion factors can interact through the matrix. The organ models constructed by the diaphragm-free chip can be used for researching interaction of cells from the two organs, researching induced migration of the cells, and researching growth, germination and the like of blood vessels in a co-culture process of the blood vessels and various tissues and organs.

Optionally, the communication mode between the first culture micropores 22 and the second culture micropores 23 is diaphragm connection. The 3D multi-organ co-culture chip composed of the culture modules is defined as a diaphragm-containing chip. For the diaphragm-containing chip, the first organ cells in the first culture micropores 22 communicate with the second organ cells in the second culture micropores 23 through the diaphragms, so that physical isolation can be realized, and co-communication of biological and chemical factors can be realized. The organ models constructed by the diaphragm-containing chip can be used for simulating interaction between a barrier type model and other organs like blood brain barriers, a diaphragm layer provides mechanical support for human brain vascular adhesion. The channels (such as through channels) can realize fluid flowing to provide necessary shearing force to the barrier. The 3D multi-organ co-culture chip is used for screening nerve drugs and tumor drugs based on blood brain barriers and performing related research, for example, an anti-brain barrier compound for the blood brain barrier.

Figure 3:
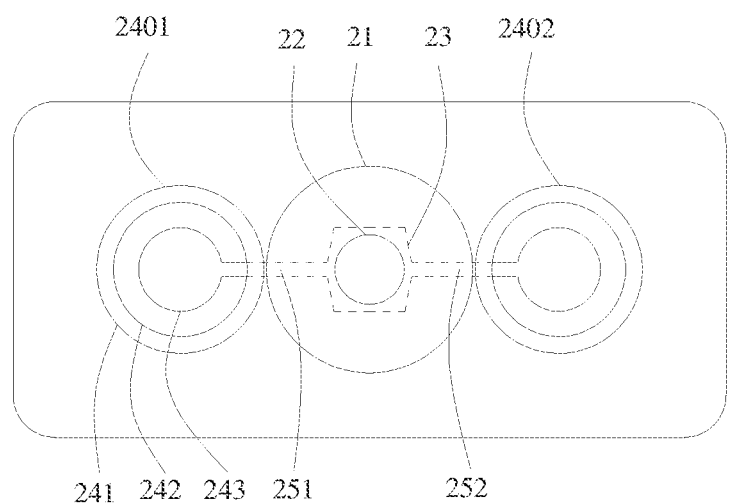
FIG. 3 is an overlook structure schematic diagram of culture modules of a 3D multi-organ co-culture chip provided by the embodiment of the present disclosure.

In some embodiments of the present disclosure, as shown in FIG. 3, the second fluid operation holes 24 are stepped holes, and the aperture of the stepped holes is reduced from the upper surface of the chip body to the inner part. The sedimentation of inoculated cells at the bottoms of the second fluid operation holes 24 is reduced. Optionally, the stepped holes comprise first-order stepped holes or second-order stepped holes. The stepped holes can be determined according to actual needs. The related content of the stepped holes can be specifically referred to the following specific structural form of the 3D multi-organ co-culture chip.

In some embodiments, a center distance between the fluid storage holes 21 and the second fluid operation holes 24 is 1-10 mm. The 3D multi-organ co-culture chip is compatible with a transmembrane resistance instrument electrode, and a TEER value can be measured in real time. The center distance refers to the distance between the centers of the fluid storage holes 21 and the centers of the second fluid operation holes 24.

Optionally, the center distance between the fluid storage holes 21 and the centers of the second fluid operation holes 24 is 3-8 mm.

In some embodiments, in the culture modules, the plurality of the second fluid operation holes 24 are arranged in pairs; an each pair of the second fluid operation holes 24 communicates through a through channel 25; each through channel 25 comprises a first side through channel 251 and a second side through channel 252, and the first side through channel 251 and the second side through channel 252 are oppositely arranged on two opposite sides of the second culture micropores 23. In the embodiment of the present disclosure, the second fluid operation holes 24 communicated with the first side through channels 251 are defined as first side second fluid operation holes 2401, and the second fluid operation holes 24 communicated with the second side through channels 252 are defined as second side second fluid operation holes 2402. In the 3D organ culture process, the first side second fluid operation holes 2401 and the first side through channels 251 can be used as sample feeding channels, and the second side second fluid operation holes 2402 and the second side through channels 252 can be used as sample discharging channels; the sample feeding channels and the sample discharging channels can be exchanged without limitation. On the upper surface of the chip body, the culture fluid in the first side second fluid operation holes 2401 or second side second fluid operation holes 2402 can be operated, so that the culture fluid in the first side through channels 251 (or second side through channels 252) flows into the second culture micropores 23, and the culture fluid in the second culture micropores 23 flows into the second side through channels 252 (or first side through channels 251), thereby implementing communication and flowing of the culture fluid in the second culture micropores 23.

In some embodiments, as shown in FIG. 1 and FIG. 2, each culture module of the first type comprises a fluid storage hole 21, a first culture micropore 22, a second culture micropore 23, two second fluid operation holes 24 (a pair of second fluid operation holes 24) and a through channel 25; the fluid storage holes 21, the first culture micropores 22 and the second culture micropores 23 are sequentially communicated from top to bottom and are coaxially arranged; the two second fluid operation holes 24 are respectively positioned at both sides of the fluid storage holes 21; the first side second fluid operation holes 2401 communicate with the second culture micropores 23 by the first side first side through channels 251, the second side second fluid operation holes 2402 communicate with the second culture micropores 23 by the second side through channels 252.

Certainly, on the basis of the culture modules of the first type, the number of the through channels 25 can also be increased, and the number of pairs of the second fluid operation holes 24 is correspondingly increased, in other words, one through channel 25 corresponds to one pair of second fluid operation holes 24 so as to obtain culture modules with different deformations, and the content are not described again here.

In some embodiments, each culture module also comprises a plurality of edge side fluid operating holes 29 and a bypass channel 26, wherein one end of each edge side fluid operating hole 29 is open and is positioned on the upper surface of the chip body; both ends of each bypass channel 26 respectively communicate with the edge side fluid operating hole 29, and a middle part of each bypass channel 26 communicates with the corresponding second culture micropore 23. In the embodiment of the present disclosure, other types of cells belonging to the same organ as cells in the second culture micropores 23 can be added into the bypass channels 26, and co-culture is realized at communication parts of the bypass channels 26 and the second culture micropores 23. The edge side fluid operating holes 29 at two ends of one bypass channel 26 can be filled with cell culture fluid, and micro-flow culture is realized.

Optionally, one or more micro-channels are formed at the communication parts of the bypass channels 26 and the second culture micropores 23. Fences (one or more) can be arranged at communication ports of the communication parts to form one or more micro-channels. The size of the micro-channels is not limited, so that the cells in the bypass channels 26 cannot pass through and enter the second culture micropores 23, but substance exchange can be realized. Physical separation of the cells in the bypass channels 26 and the cells in the second culture micropores 23 is realized, and cell secretion factor exchange of the bypass channels 26 and the second culture micropores 23 is realized.

Figure 4:
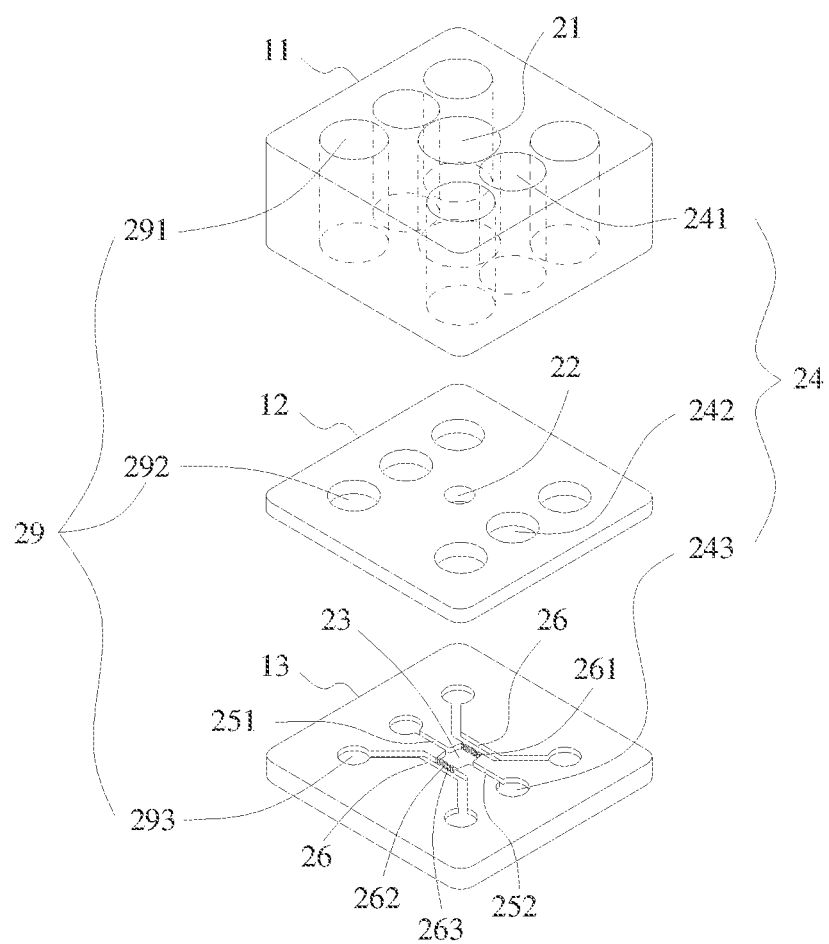
FIG. 4 is a structure exploded schematic diagram of culture modules of another 3D multi-organ co-culture chip provided by the embodiment of the present disclosure.
Figure 5:
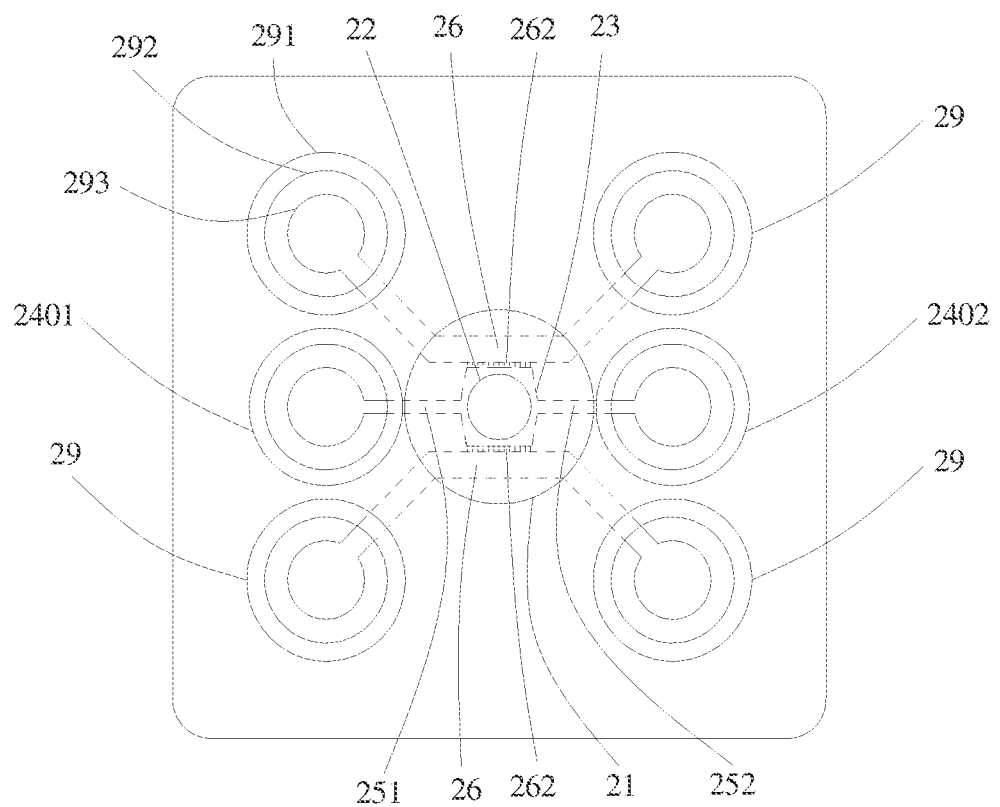
FIG. 5 is an overlook structure schematic diagram of culture modules shown in the FIG. 4.
Figure 6:
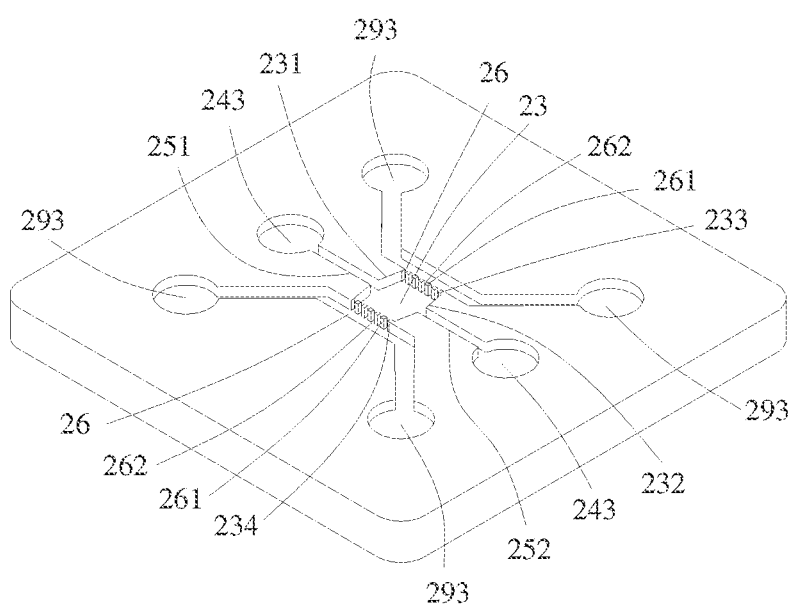
FIG. 6 is a local structure schematic diagram of culture modules of another 3D multi-organ co-culture chip provided by the embodiment of the present disclosure.

As shown in FIG. 4 and FIG. 5, multiple fences are arranged at the communication parts of the bypass channels 26 and the second culture micropores 23, and multiple micro-channels can be formed. The construction modes of the multiple fences and the micro-channels are not limited.

Optionally, as shown in FIG. 4 and FIG. 5, one or more vertical fences 261 are arranged at the communication port of one side wall of the middle of each bypass channel 26 and the corresponding second culture micropore 23 at set intervals, and the communication port is divided into multiple vertical and parallel micro-channels 262. The cells or 3D matrix in the second culture micropores 23 and the bypass channels 26 can be controlled to independently grow and keep factor exchange by controlling the height and width of the vertical micro-channels.

Optionally, one or more transverse fences 263 are arranged on the communication port of one side wall of the middle of each bypass channel 26 and the corresponding second culture micropore 23 along the transverse direction. When one transverse fence 263 is arranged along the transverse direction, the transverse fence is arranged in the middle of the vertical upper part of each communication port, that is, one transverse micro-channel 264 is formed above and below the transverse fence respectively. When multiple transverse fences are arranged along the transverse direction, the transverse fences are arranged at set intervals.

Figure 7:
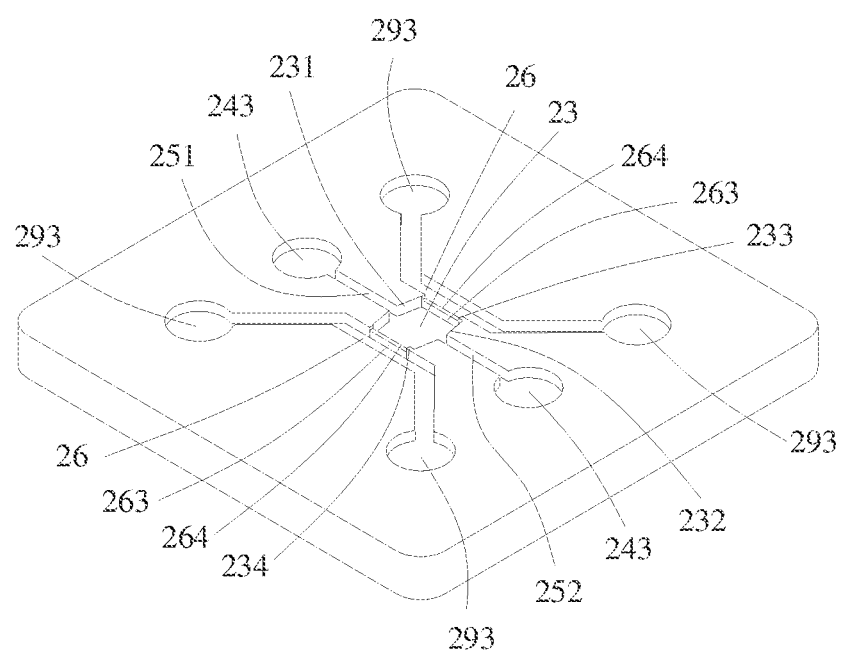
FIG. 7 is a local structure schematic diagram of culture modules of another 3D multi-organ co-culture chip provided by the embodiment of the present disclosure.

As shown in FIG. 7, one micro-channel is formed at the communication part of each bypass channel 26 and the corresponding second culture micropore 23. The construction mode of the micro-channel is not limited, optionally, a transverse fence 262 is arranged at the communication part of one side wall of each bypass channel 26 and each second culture micropore 23 and covers the lower part (as shown in FIG. 7) or the upper part of the communication part, so that a transverse micro-channel 264 is formed above or below the transverse fence 262 (as shown in the FIG. 7).

In some embodiments, the bypass channels 26 are arranged on two sides or one side of the other two opposite sides of the second culture micropores 23 which are not communicated with the through channels 25. The second fluid operation holes 24 with the same number as the bypass channels 26 are correspondingly increased and are respectively and correspondingly communicated with two ports of the bypass channels 26.

Optionally, as shown in FIG. 4 and FIG. 5, the culture modules of the second type are that two bypass channels 26 are added on the basis of the culture modules of the first type and are respectively arranged on the other two opposite sides of the second culture micropores 23 which are not communicated with the through channels 25; communication ports at the communication parts of the bypass channels 26 and the second culture micropores 23 are separated into a plurality of vertical micro-channels 262 by utilizing a plurality of vertical fences 261. Two pairs of side fluid operation holes 29 are correspondingly added and correspondingly communicate with four end ports of the two bypass channels 26.

Optionally, one deformation of the culture modules of the second type is that one bypass channel 26 is added on the basis of the culture modules of the first type and is arranged on one side of the other two opposite sides of the second culture micropores 23 which are not communicated with the through channels 25; communication ports at the communication parts of the bypass channels 26 and the second culture micropores 23 are separated into the plurality of vertical microchannels 262 by utilizing the plurality of vertical fences 261. A pair of side fluid operation holes 29 is correspondingly increased and are correspondingly communicated with two end ports of one bypass channel 26. As shown in FIGS. 4 and 5, only one bypass channel 26 is added on one side edge.

In some embodiments, as shown in FIG. 7, the culture modules of the third type are that the communication port at the communication part of each bypass channel 26 and the corresponding second culture micropore 23 is set as a micro-channel on the basis of the culture modules of the second type. The construction of the micro-channel refers to the related content and is not repeated here.

In some embodiments, as shown in FIG. 4 to FIG. 7, the extension direction of the bypass channels 26 are consistent with that of the through channels 25. The flowing of the culture fluid in the second culture micropores 23 is in a certain rule, and the culture effect is good. For example, gravity-driven two-directional flowing or one-direction driven flowing.

Optionally, as shown in FIG. 7, the second culture micropores are square and are provided with first side edges 231, second side edges 232, third side edges 233 and fourth side edges 234. The first side edges 231 and the second side edges 232 are two opposite side edges, and the third side edges 233 and the fourth side edges 234 are two opposite side edges; first side through channels 251 of the through channels 25 are arranged on the sides of the first side edges 231, second side through channels 252 of the through channels 25 are arranged on the sides of the second side edges 232, and communication ports are formed in the third side edges 233 and/or the fourth side edges 234 and are used for communicating with the middle parts of the bypass channels 26.

In some embodiments, as shown in FIG. 8 to FIG. 13, the culture modules further comprise a plurality of first fluid operation holes 27; an end of an each of the plurality of the first fluid operation holes 27 is open and is located on the upper surface of the chip body, and an other end of the each of the plurality of the first fluid operation holes 27 communicates with the fluid storage holes 21 through first communication channels 28. Communication and flowing of fluid in the fluid storage holes 21 and the first fluid operation holes 27 are realized through the first communication channels 28, and the flow of the culture fluid in the fluid storage holes 21 can be realized by operating the culture fluid in the first fluid operation holes 27, namely, the culture environment in the first culture micropores 22 surrounded by the culture fluid in the fluid storage holes 21 are in a flow state, so that a dynamic culture environment is formed.

In the embodiments of the present disclosure, the arrangement positions and number of the plurality of first fluid operation holes 27 are not limited, and the fluid cultured in the fluid storage holes 21 can be realized only by operating the culture fluid in the first fluid operation holes 27. Optionally, the plurality of first fluid operation holes 27 are divided into two groups, and the two groups of first fluid operation holes 27 are arranged at the two opposite sides of the fluid storage holes 21 respectively. That is, the plurality of first fluid operation holes 27 are divided into first side first fluid operation holes 271 and second side first fluid operation holes 272. The first sides and the second sides can be the same as some first sides and second sides of the second fluid operation holes 24.

Optionally, in the culture modules, the plurality of first fluid operation holes 27 are arranged in pairs, and each pair of first fluid operation holes 27 is arranged at the two opposite sides of the fluid storage holes 21 respectively.

Figure 8:
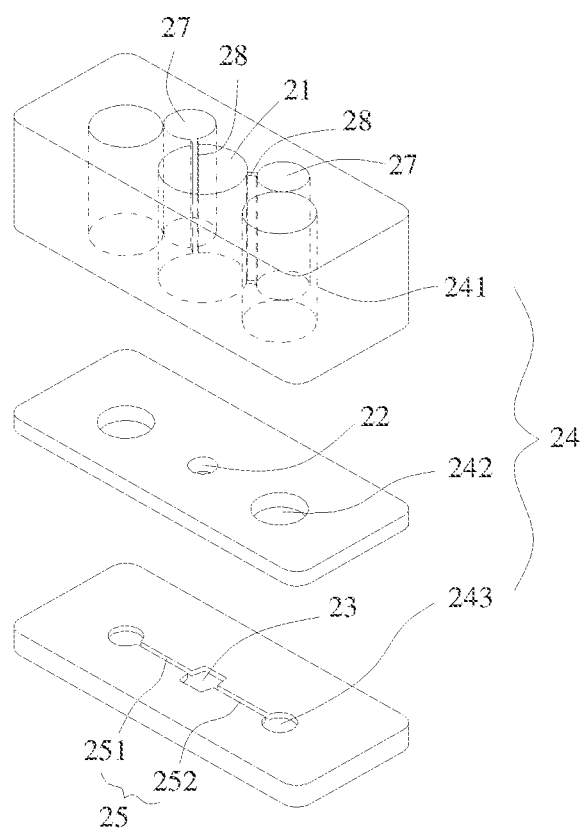
FIG. 8 is a structure exploded schematic diagram of culture modules of another 3D multi-organ co-culture chip provided by the embodiment of the present disclosure.
Figure 9:
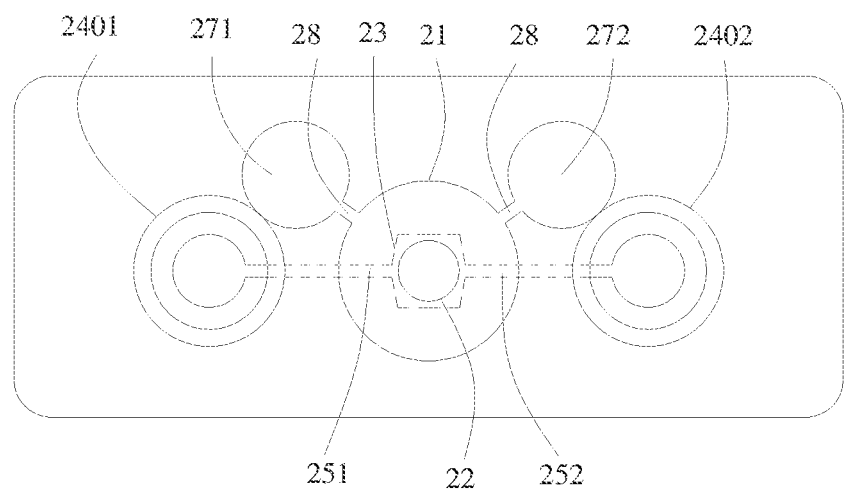
FIG. 9 is an overlook structure schematic diagram of culture modules shown in the FIG. 8.
Figure 10:
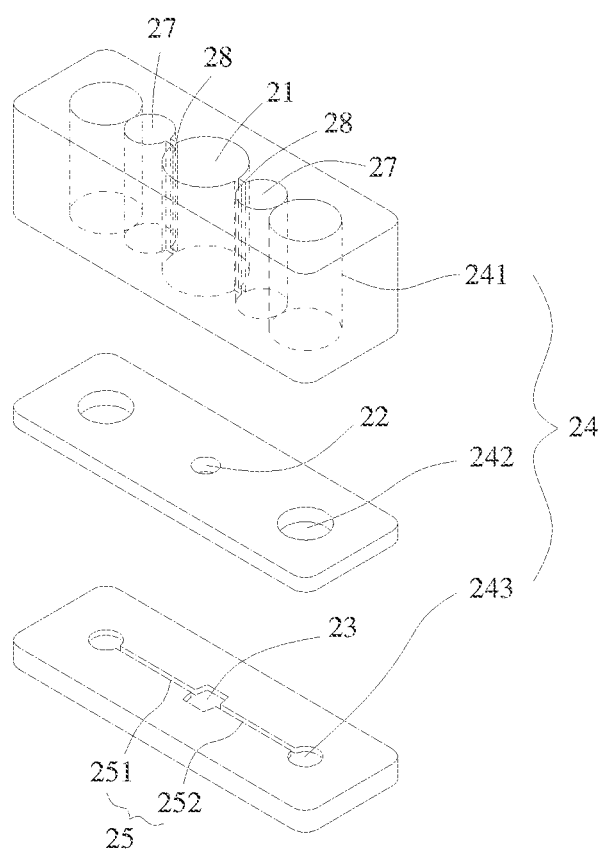
FIG. 10 is a structure exploded schematic diagram of culture modules of another 3D multi-organ co-culture chip provided by the embodiment of the present disclosure.
Figure 11:
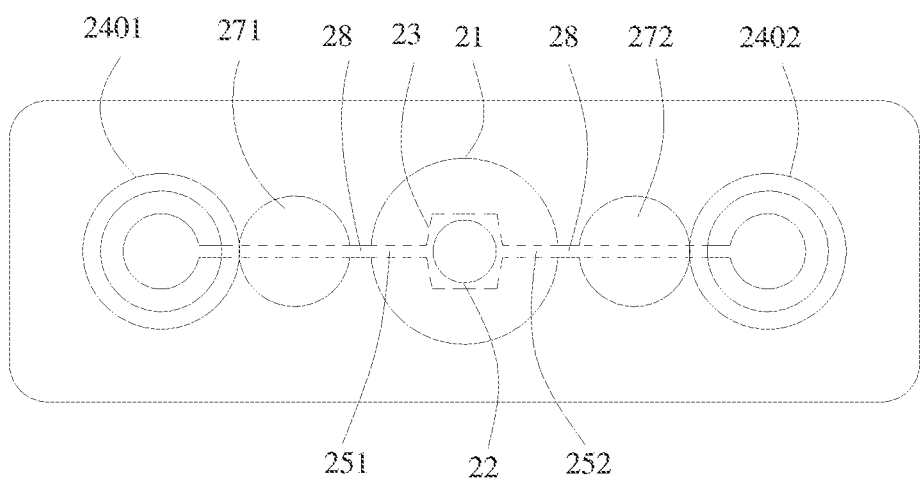
FIG. 11 is an overlook structure schematic diagram of culture modules shown in the FIG. 10.
Figure 12:
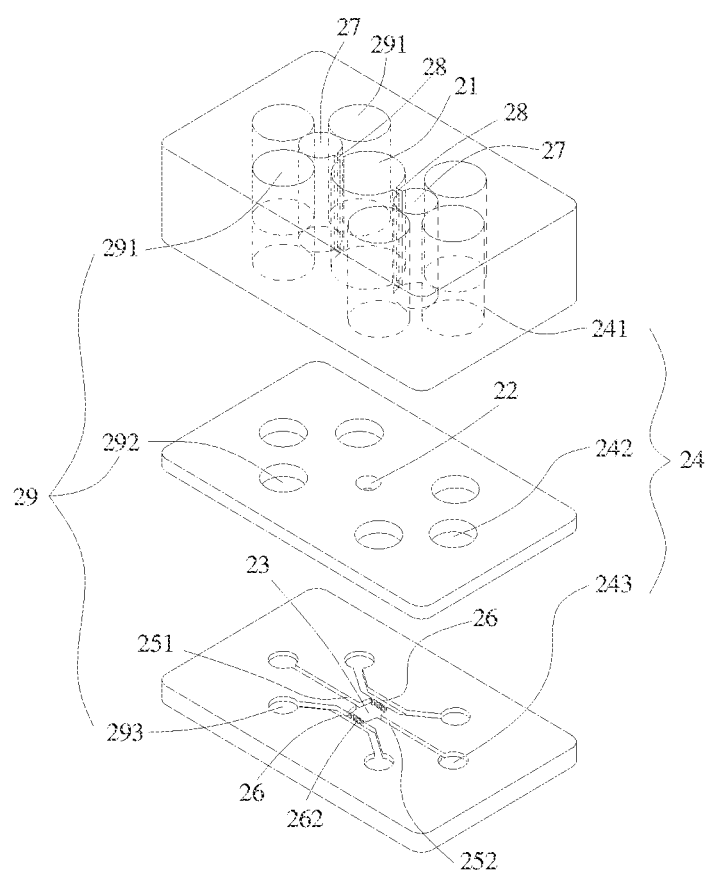
FIG. 12 is a structure exploded schematic diagram of culture modules of another 3D multi-organ co-culture chip provided by the embodiment of the present disclosure.
Figure 13:
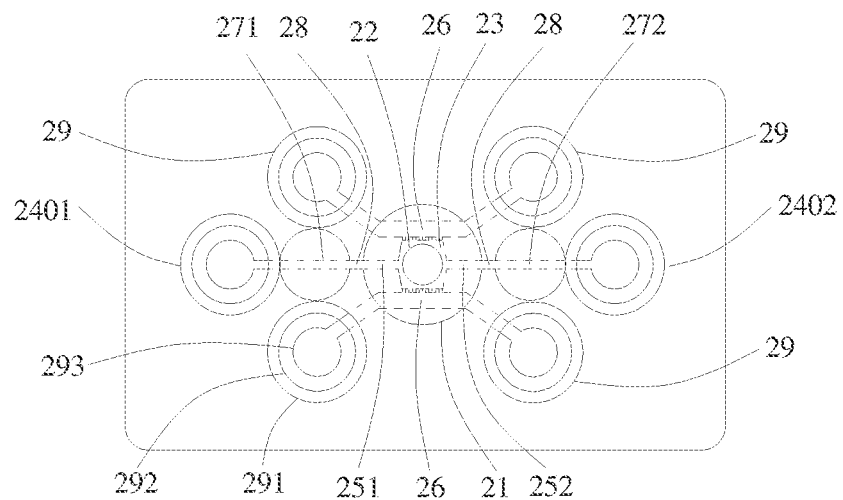
FIG. 13 is an overlook structure schematic diagram of culture modules shown in the FIG. 12.

Optionally, in the culture modules, two first fluid operation holes 27 are provided and arranged at the two opposite sides of the fluid storage holes 21 respectively. As shown in FIG. 10 to FIG. 13, the first fluid operation holes 27 are arranged at the two opposite sides, passing through the diameter, of the fluid storage holes 21, and are parallel to the through channels 25. Or, as shown in FIG. 8 and FIG. 9, a set included angle is formed between connection lines of the two first fluid operation holes 27 and the centers of the fluid storage holes 21, namely, the first fluid operation holes 27 are arranged at the two opposite sides, not passing through the diameter, of the fluid storage holes 21. The included angles are not limited by setting. And the arrangement positions of the first fluid operation holes 27 in the embodiments of the present disclosure are not limited.

In the embodiment of the present disclosure, a plurality of first fluid operation holes 27 are respectively added on the basis of the culture modules of the first type, the culture modules of the second type and the culture modules of the third type, so that the first fluid operation holes 27 respectively communicate with the fluid storage holes 21 through the first communication channels 28 to form culture modules of the fourth type, culture modules of the fifth type and culture modules of the sixth type.

In the 3D multi-organ co-culture chip provided by the embodiment of the present disclosure, only one or more culture modules are needed, and the specific constitution form is not limited. The specific structural form of the 3D multi-organ co-culture chip is provided below, but is not limited to the specific structural form.

In some embodiments, the chip body comprises:
a first fluid storage layer 11 which is provided with the fluid storage holes 21 and second operation holes I 241 of the second fluid operation holes 24;
a first culture layer 12 which is provided with the first culture micropores 22 and second operation holes II 242 of the second fluid operation holes 24; the first culture layer 12 is overlapped below the first fluid storage layer 11, so that the first culture micropores 22 communicate with the fluid storage holes 21; the second operation holes II 242 communicate with the second operation holes I 241;
a second culture layer 13 which is provided with the second culture micropores 23 and the channels (such as the through channels 25); the second culture layer 13 is overlapped below the first culture layer 12, so that the second culture micropores 23 communicate with the first culture micropores 22, and the channels communicate with the second culture micropores 23 and the second operation holes II 242.

In the embodiment of the present disclosure, the chip body comprises three layers of chip structures, and the three layers of chip structures are sequentially stacked and connected. The three layers of chip structures can be bonded and assembled together by using sealing processes such as double-sided adhesive, ultrasound, thermal bonding, plasma and hot pressing. The first fluid storage layer 11 and the first culture layer 12 can be combined into a one-layer structure for processing, and the processing can be determined according to actual conditions.

In the embodiment of the present disclosure, the material of each layer of chip structure in the chip body is one or more of polymethyl methacrylate (PMMA), polydimethylsiloxane (PDMS), polycarbonate (PC), PS, COC, COP and the like. The manufacturing of each layer of structure can adopt soft lithography, a molding method, laser etching, machining, LIGA or one-time injection molding and other modes to obtain each layer of chip structure.

Optionally, the second fluid operation holes 24 are stepped holes; the aperture of the second operation holes I 241 is greater than that of the second operation holes II 242. The second fluid operation holes 24 in the embodiment are first-order stepped holes.

In the embodiment of the present disclosure, the channel (through channels 25) on the second culture layer 13 communicate with the second operating holes II 242 in the first culture layer 12. The communication mode is not limited. Optionally, one end of each channel extends into the corresponding second operating hole II 242 to communicate with the corresponding second operating hole II 242.

Optionally, holes slot are also formed in the second culture layer 13, and one end port of each channel is formed in the side wall of the corresponding hole slot, that is, the hole slots can be regarded as second operating holes III 243 of the second fluid operating holes 24.

Optionally, the aperture of the second operating holes 1241 is greater than that of the second operating holes II 242, and the aperture of the second operating holes II 242 is greater than that of the second operating holes III 243. The residence of cells in the holes during cell inoculation is reduced. The second fluid operating holes 24 in the embodiment are second-order stepped holes.

Optionally, the aperture of the second operating holes I 241 is equal to that of the second operating holes II 242, and the aperture of the second operating holes II 242 is greater than that of the second operating holes III 243. The second operating holes I 241 and the second operating holes II 242 are the same in size, so that the generation of bubbles is reduced; and the aperture of the second operating hole III 243 is minimum, so that the deposition of cells in the holes during cell inoculation is reduced. The second fluid operating holes 24 in the embodiment are first-order stepped holes.

In some embodiments, when the culture modules comprise the edge side fluid operating holes 29, side edge operating holes I 291 of the side fluid operating holes 29 are also formed in the first fluid storage layer 11, side edge operating holes II 292 of the side fluid operating holes 29 are also formed in the first culture layer 12, and the side edge operating holes II 292 communicate with the side edge operating holes I 291; bypass channels 26 are also formed in the second culture layer 13, and the bypass channels 26 communicate with the second culture micropores 23 and the side edge operating holes II 292.

In the embodiment of the present disclosure, the bypass channels 26 on the second culture layer 13 communicate with the side edge operation holes II 292 on the first culture layer 12. The communication mode is not limited. Optionally, one end of each bypass channel 26 extends into the corresponding side edge operation hole II 292 to communicate with the corresponding side edge operation hole II 292.

Optionally, the hole slots are also formed in the second culture layer 13, and one port of each bypass channel 26 is formed in the side wall of the corresponding hole slot, that is, the hole slots can be regarded as side edge operation holes III 293 of the edge side fluid operating holes 29.

In the embodiment of the present disclosure, the structural forms of the side fluid operation holes 29 are the same as those of the second fluid operation holes 24.

Optionally, the edge side fluid operating holes 29 are stepped holes; the formation forms of the stepped holes refer to the second fluid operation holes 24.

In some embodiments, when the culture modules comprise first fluid operation holes 27, the first fluid operation holes 27 and first communication channels 28 are also formed in the first fluid storage layer 11.

Optionally, the first fluid operation holes 27 are straight hole.

Optionally, the first communication channels 28 are formed in the side wall between the fluid storage holes 21 and the first fluid operation holes 27 in a penetrating manner.

In some embodiments, the chip body also comprises the film layers 14, and micro-nano-sized pores are distributed in the film layers 14; the film layers 14 are arranged between the first culture micropores 22 and the second culture micropores 23. That is, the film layer 14 is added on the basis of the three-layer chip body to form a four-layer chip body. In the embodiment of the present disclosure, the film layers 14 can be transparent polyethylene terephthalate (PET) films with apertures. When the four-layer chip body in the embodiment of the present disclosure is assembled, the film layers 14 can be assembled with the first fluid storage layer 11 and the first culture layer 12 as a whole, and then the whole is assembled with the second culture layer 13. In the embodiment of the present disclosure, the film layers 14 are arranged in a manner of avoiding the communication parts of the second fluid operation holes 24 and the micro channels (through channels 25 and bypass channels 26).

In the embodiment of the present disclosure, the 3D multi-organ co-culture chip is divided into the film-free chip and the film-containing chip (the same as the abovementioned diaphragm-free chip and the diaphragm-containing chip) according to whether the film layers 14 are arranged between the first culture micropores 22 and the second culture micropores 23.

In some embodiments, the fluid storage holes 21 and the second operation holes I 241 formed in the first fluid storage layer 11 are columnar holes. When the culture modules comprise the edge side fluid operating holes, the side edge operation holes I formed in the first fluid storage layer are columnar holes. When the culture modules comprise the first fluid operation holes, the first fluid operation holes are columnar holes. In the embodiment, a plurality of columnar holes protruding out of the surface of the first fluid storage layer 11 are formed in the first fluid storage layer 11, so that mutual influence of solutions in different holes is avoided, and pollution is avoided.

The embodiment of the present disclosure relates to application of the 3D multi-organ co-culture chip in in-vitro construction of a multi-organ model. A specific in-vitro construction method of the multi-organ model is given as a reference, and the application of the 3D multi-organ co-culture chip in in-vitro construction of the multi-organ model is not limited to the following construction method.

The construction method of the co-culture chip in construction of the 3D blood vessel and tumor multi-organ model provided by the embodiment of the present disclosure comprises the following steps:

performing ultraviolet sterilization on the chip, adding 20 microliters of low-concentration rat tail I type collagen into the second fluid operation holes 24 after sterilization, incubating at the temperature of 37 DEG C., then discarding, and cleaning for three times by using PBS. Adding 2 microliters of fibrin (2.5 mg/mL) to collagen (0.2 mg/mL) gel into the second culture micropores 23 along the first culture micropores 22 for culturing, ensuring that the gel can only fill the second culture micropores 23, and solidifying at the temperature of 37 DEG C. for 0.5 hour.

Digesting and centrifuging HUVECs, resuspending into a single-cell suspension with a certain concentration ($1*10<6>$ cells/mL) by using a complete medium, and adding 20 microliters of endothelial cell suspension at the end port (which can be defined as a sample feeding port) of each first side through channel 251 (comprising the through channel 25 and the bypass channel 26). Inclining the chip to enable endothelial cells to be fully attached to the surfaces of the solidified fibrin and collagen gel.

Digesting and centrifuging U251 cells on the second day after inoculation of the HUVECs, resuspending into a 200 w/ml single-cell suspension by using a culture medium containing 10 percent of serum, and adding 5 mg/mL of collagen or matrix gel or other matrix materials with specific volumes into a 1.5 ml EP tube according to a ratio to ensure that the 3D material forms a good three-dimensional structure under the concentration. Then adding the cell suspension according to a ratio, uniformly blowing and mixing by using a pipette, rapidly transferring and inoculating into the first culture micropores 22 in a high-flux manner, wherein 6-12 microliters of cells are inoculated into the first culture micropores 22 according to the size of each micropore; transferring the whole chip into a culture box at the temperature of 37 DEG C. after cell planting.

The above description and drawings fully illustrate the embodiments of the present disclosure to enable those skilled in the art to practice them. Other embodiments may include structural and other changes. The embodiments only represent possible changes. Unless explicitly required, the individual components and functions are optional, and the order of operations can be changed. Parts and features of some embodiments may be included in or substituted for parts and features of other embodiments. The embodiments of the present disclosure are not limited to the structures that have been described above and shown in the drawings, and various modifications and changes can be made without departing from the scope thereof. The scope of the present disclosure is only limited by the appended claims.

What is claimed is:

1. A 3D multi-organ co-culture chip, comprising a chip body, a plurality of groups of culture modules being arranged on the chip body; the plurality of groups of culture modules are arranged according to spacing and high flux of porous plates; wherein each group of the culture modules comprises:
   a fluid storage hole of which an end is open and is positioned at an upper surface of the chip body;
   a first culture micropore which is positioned below a corresponding fluid storage hole and communicates with the corresponding fluid storage hole; the first culture micropore is used for culturing a first organ cell;

a second culture micropore which is positioned below a corresponding first culture micropore and communicates with the corresponding first culture micropore; the second culture micropore is used for culturing a second organ cell; a cross section of the fluid storage hole is larger than a cross section of the first culture micropore, and a cross section of the second culture micropore is larger than or equal to the cross section of the first culture micropore;

a plurality of first fluid operation holes, an end of each of the plurality of the first fluid operation holes is open and is located on the upper surface of the chip body, and another end of the each of the plurality of the first fluid operation holes communicates with the fluid storage holes through first communication channels;

a plurality of second fluid operation holes, wherein an end of a second fluid operation hole is open and is positioned on the upper surface of the chip body, and another end of the same second fluid operation hole communicates with a corresponding second culture micropore through a channel; the plurality of the second fluid operation holes are arranged in pairs; each pair of the second fluid operation holes communicates through a through channel; and the through channel comprises a first side through channel and a second side through channel, and the first side through channel and the second side through channel are oppositely arranged on two opposite sides of the corresponding second culture micropore;

a plurality of edge side fluid operating holes, and an end of an edge side fluid operating hole is open and is positioned on the upper surface of the chip body; and bypass channels, each bypass channel having two ends and a middle part, wherein each end respectively communicates with one of the edge side fluid operating holes, and the middle part communicates with the corresponding second culture micropore; a sidewall of the middle part at a communication portion with the second culture micropore is provided with a plurality of micro-channels, wherein cells within the each bypass channel are physically separated from cells within the second culture micropore; and bypass channels are used for culturing organ cells which are other types of cells belonging to the same organ as cells in the second culture micropores.

2. The 3D multi-organ co-culture chip according to claim 1, wherein:
the cross section of each fluid storage hole is larger than the cross section of each second culture micropore of the plurality of groups of culture modules.

3. The 3D multi-organ co-culture chip according to claim 1, wherein: a center distance between the fluid storage holes and the second fluid operation holes is 1-10 mm.

4. The 3D multi-organ co-culture chip according to claim 1, wherein: the chip body comprises:
a first fluid storage layer which is provided with the fluid storage holes and second operation holes I of the second fluid operation holes;
a first culture layer which is provided with the first culture micropores and second operation holes II of the second fluid operation holes; the first culture layer is overlapped below the first fluid storage layer so that the first culture micropores communicate with the fluid storage holes; the second operation holes II communicate with the second operation holes I;
a second culture layer which is provided with the second culture micropores and channels; the second culture layer is overlapped below the first culture layer so that the second culture micropores communicate with the first culture micropores, and the channels communicate with the second culture micropores and the second operation holes II;
side edge operating holes I of the edge side fluid operating holes are also formed in the first fluid storage layer, side edge operating holes II of the edge side fluid operating holes are also formed in the first culture layer, and the side edge operating holes II communicate with the side edge operating holes I; the bypass channels are also formed in the second culture layer, and the bypass channels communicate with the second culture micropores and the side edge operating holes II; and
the first fluid operation holes and the first communication channels are also formed in the first fluid storage layer.

5. The 3D multi-organ co-culture chip according to claim 4, wherein: the chip body also comprises:
film layers, wherein micrometer-sized to nanometer-sized pores are distributed in the film layers; and the film layers are arranged between the first culture micropores and the second culture micropores.

6. The 3D multi-organ co-culture chip according to claim 4, wherein: the fluid storage holes and the second operation holes I formed in the first fluid storage layer are columnar holes;
the side edge operating holes I formed in the first fluid storage layer are the columnar holes; and
the first fluid operation holes are the columnar holes.

7. The 3D multi-organ co-culture chip according to claim 1, wherein the first organ cell in the first culture micropore and the second organ cell in the second culture micropore are physically isolated, while allowing exchange of a biological factor and/or a chemical factor between the first organ cell and the second organ cell.

8. The 3D multi-organ co-culture chip according to claim 7, wherein the first organ cell in the first culture micropore and the second organ cell in the second culture micropore are physically isolated through a 3D matrix or a diaphragm.

9. The 3D multi-organ co-culture chip according to claim 7, wherein the 3D multi-organ co-culture chip is configured for constructing models for researching interactions between multiple organs.

10. The 3D multi-organ co-culture chip according to claim 7, wherein the first organ cell in the first culture micropore is selected from the group consisting of vascular cells and tumor cells, and the second organ cell in the second culture micropore is different from the first organ cell, and is selected from the group consisting of vascular cells and tumor cells.

11. The 3D multi-organ co-culture chip according to claim 1, wherein a plurality of vertical fences at a set interval are arranged at the communication portion, the plurality of vertical fences divide the communication portion into a plurality of vertical and parallel micro-channels, allowing for cell secretion factor exchange between each bypass channel and the second culture micropore, while physically isolating cells within each bypass channel from cells within the second culture micropore.

* * * * *